(12) United States Patent
Guérin et al.

(10) Patent No.: US 11,172,139 B2
(45) Date of Patent: Nov. 9, 2021

(54) AUTO EXPOSURE METERING FOR SPHERICAL PANORAMIC CONTENT

(71) Applicant: GoPro, Inc., San Mateo, CA (US)

(72) Inventors: Guillaume Matthieu Guérin, Chatillon (FR); Giuseppe Moschetti, Saint Cloud (FR); Sylvain Leroy, Bures-sur-Yvette (FR); Yoël Taïeb, Paris (FR)

(73) Assignee: GoPro, Inc., San Mateo, CA (US)

( * ) Notice: Subject to any disclaimer, the term of this patent is extended or adjusted under 35 U.S.C. 154(b) by 63 days.

(21) Appl. No.: 16/817,074

(22) Filed: Mar. 12, 2020

(65) Prior Publication Data

US 2021/0289118 A1    Sep. 16, 2021

(51) Int. Cl.
*H04N 5/235*    (2006.01)
*H04N 5/232*    (2006.01)

(52) U.S. Cl.
CPC ......... *H04N 5/2353* (2013.01); *H04N 5/2351* (2013.01); *H04N 5/23238* (2013.01)

(58) Field of Classification Search
CPC .............. H04N 5/2353; H04N 5/2351; H04N 5/23238; G03B 35/00; G03B 37/00
See application file for complete search history.

(56) References Cited

U.S. PATENT DOCUMENTS

| | | | |
|---|---|---|---|
| 2010/0134651 A1* | 6/2010 | Morimoto | H04N 5/2354 348/229.1 |
| 2011/0169921 A1* | 7/2011 | Lee | H04N 13/246 348/46 |
| 2013/0033582 A1* | 2/2013 | Sun | H04N 13/122 348/47 |
| 2013/0307937 A1* | 11/2013 | Kim | H04N 5/23267 348/47 |
| 2014/0240534 A1* | 8/2014 | Kim | H04N 5/23293 348/223.1 |
| 2017/0220875 A1* | 8/2017 | Jeromin | H04N 5/247 |
| 2017/0257548 A1* | 9/2017 | Tamai | H04N 9/735 |
| 2017/0289515 A1* | 10/2017 | Li | H04N 13/156 |
| 2019/0007590 A1* | 1/2019 | Lee | H04N 5/2251 |
| 2019/0174054 A1* | 6/2019 | Srivastava | H04N 5/23293 |
| 2020/0043198 A1* | 2/2020 | Guo | G06T 7/33 |
| 2021/0084205 A1* | 3/2021 | Guerin | H04N 9/77 |

\* cited by examiner

*Primary Examiner* — Lin Ye
*Assistant Examiner* — John H Morehead, III
(74) *Attorney, Agent, or Firm* — Young Basile Hanlon & MacFarlane, P.C.

(57) ABSTRACT

Auto exposure metering is adapted for spherical panoramic content. Using input image data, a first metering map is generated for a selected image sensor and a second metering map is generated for an unselected image sensor. Auto exposure level values for the selected image sensor and for the unselected image sensor are respectively metered using the first metering map and the second metering map, such as by adjusting luminance weights in certain locations of the respective image sensor panoramic image capture band. Hemispherical images are processed using the auto exposure metered level values and stitched together in a panoramic format to produce a spherical panoramic image. The metering maps are generated to account for areas of greatest image data importance relative to a primary orientation direction of the spherical panoramic image. This allows for effective auto exposure metering of such areas within the resulting spherical panoramic image.

20 Claims, 11 Drawing Sheets

AUTO EXPOSURE METERING FOR SPHERICAL PANORAMIC CONTENT

TECHNICAL FIELD

This disclosure relates to systems and techniques for auto exposure metering for spherical panoramic content.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be processed and then stored or output. In some cases, the ISP may be used to capture multiple images or video frames which are spatially adjacent or otherwise include overlapping content. Each of the multiple images may be captured using a different image sensor and according to different configurations for the image sensor.

SUMMARY

Disclosed herein are implementations of systems and techniques for auto exposure metering for spherical panoramic content.

One aspect of this disclosure is an image capture device. The image capture device comprises a first image sensor arranged in a first direction, a second image sensor arranged in a second direction opposing the first direction, a memory that stores instructions for producing a spherical panoramic image using auto exposure control statistics for the first image sensor and the second image sensor, and a processor that executes the instructions. The instructions include instructions to: receive a first input from the first image sensor and a second input from the second image sensor; generate, using the first input, a first metering map representing luminance weights for a panoramic image capture band of the first image sensor; generate, using the second input, a second metering map representing luminance weights for a panoramic image capture band of the second image sensor; determine the auto exposure control statistics for the first image sensor using the first metering map and for the second image sensor using the second metering map; capture, according to the auto exposure control statistics, a first hemispherical image using the first image sensor and a second hemispherical image using the second image sensor; and produce the spherical panoramic image by combining a portion of the first hemispherical image corresponding to the panoramic image capture band of the first image sensor and a portion of the second hemispherical image corresponding to the panoramic image capture band of the second image sensor.

Another aspect of this disclosure is a method. The method comprises receiving first input captured using a selected image sensor of an image capture device and second input captured using an unselected image sensor of the image capture device, generating a first metering map representing weighted values corresponding to the first input and a second metering map representing weighted values corresponding to the second input, producing auto exposure metered image data by metering auto exposure levels of a first image captured using the selected image sensor according to the first metering map and by metering auto exposure levels of a second image captured using the unselected image sensor according to the second metering map, and producing a spherical panoramic image using the auto exposure metered image data.

Yet another aspect of this disclosure is an image processor. The image processor comprises an auto exposure metering unit, an image processing unit, and an image stitching unit. The auto exposure metering unit determines auto exposure control statistics adapted for spherical panoramic image content capture for a first image sensor and a second image sensor using metering maps generated based on input received from the first image sensor and from the second image sensor. The image processing unit produces first auto exposure metered image data by processing, according to the auto exposure control statistics, a first hemispherical image captured using the first image sensor and that produces second auto exposure metered image data by processing, according to the auto exposure control statistics, a second hemispherical image captured using the second image sensor. The image stitching unit stitches the first auto exposure metered image data and the second auto exposure metered image data in a panoramic format to produce a spherical panoramic image.

These and other aspects of this disclosure are disclosed in the following detailed description, the appended claims, and the accompanying figures.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
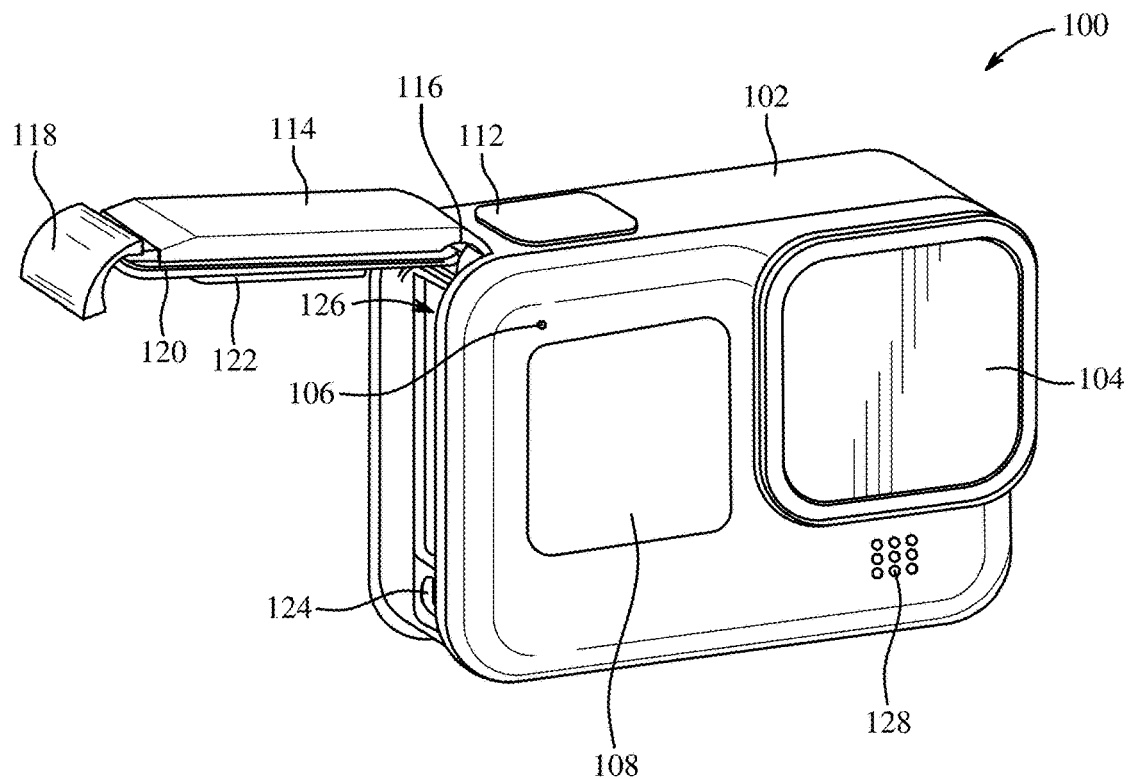
FIGS. 1A-B are isometric views of an example of an image capture device.

Image capture devices are designed with numerous features to assists users in producing high quality images. One example of such a feature is the ability to combine two or more images into a single, composite image. A typical example of a composite image is a two-dimensional panoramic image, which is typically produced by horizontally combining two images to show a larger scene than could be shown by a single image alone. Combining two or more subject images to produce a composite image requires careful processing of those images, such as to ensure that the juxtaposed portions of each respective subject image are aligned properly and with minimal distortion.

One approach to combining images in this way is image stitching. Image stitching is the process of combining multiple images with overlapping fields-of-view to produce a composite image. Image stitching may include aligning the pixels of two images being combined in a region along a boundary between sections of a composite image that are respectively based on two different input images. The resulting line or lines of pixels forming the overlapping portion between those two images is referred to as a stitch line. The stitching may be passively performed (e.g., by a processing component of the image capture device or another device), such as automatically upon the capturing of the subject images. Alternatively, the stitching may be in response to user intervention, such as by a user of the image capture device selecting to combine the subject images.

Another example of a composite image which may be produced using image stitching is a spherical image, which may also be referred to as a 360 degree image. A spherical image is a composite image formed by stitching two or more images, captured using two or more image sensors having overlapping fields of view, such that the resulting image shows a complete 360 degree field-of-view around the image capture device used to capture those two or more images. For example, a spherical image may be produced by stitching two or more images captured using fisheye lenses. Improvements in image capture technology have made spherical images increasingly popular. For example, spherical images are frequently used to show a full environmental rendering of a scene, such as to immerse a viewer in the environment. In another example, spherical images are used to produce virtual reality experiences.

As with conventional two-dimensional images, spherical images may be processed using one or more techniques to identify and/or enhance the content thereof. One example of such processing is auto exposure metering, in which a light exposure level used by an image sensor to capture an image is automatically adjusted based on lighting and related conditions of a scene in the direction of the image sensor. The exposure level can be set by adjusting the aperture, the shutter speed, and/or other aspects of the image sensor or of the image capture device which are used by the image sensor to capture an image. In the context of spherical images, in which an image capture device can be considered to include a rear image sensor and a front image sensor, auto exposure metering is conventionally performed separately for each of the rear image sensor and the front image sensor.

However, that conventional approach may suffer from drawbacks. In particular, the separate auto exposure metering processing for the rear and front image sensors may result in poor image quality for the spherical image ultimately produced using those image sensors. For example, a scene facing the front image sensor may be very dark while a scene facing the rear image sensor may be very bright. In such a case, the front and rear image sensors would use very different exposure levels for the image capture, resulting in a local exposure variation visible along the stitch line of the spherical image. Even where the hemispherical images are compensated according to the different exposure levels, there is likely to be a local exposure variation visible along the stitch line of the spherical image, particularly where the signal to noise ratio (SNR) for each image sensor is different and/or where there are large number of image details along the stitch line. Similarly, using similar auto exposure metering for each of the front and rear image sensors where the respective scene brightness levels are different may result in poor dynamic range for the spherical image.

Further auto exposure metering challenges arise in the context of spherical panoramic images, which are panoramic images produced using spherical image capture and processing. Generally, whereas a conventional panoramic image captured using a non-spherical image capture device is formed by the horizontal or vertical stitching of images captured using a single image sensor, a spherical panoramic image is a slice of a spherical image captured using multiple (e.g., two, such as front and rear) image sensors of an image capture device. A spherical panoramic image may have a generally 270 degree field of view in a primary orientation direction (e.g., horizontally or vertically relative to an orientation of the image capture device) and a generally 90 degree field of view in an orientation direction perpendicular to the primary orientation direction. For example, where the spherical panoramic image is a horizontal panoramic, it may have a 270 degree horizontal field of view and a 90 degree vertical field of view. The generally 270 degree field of view centrally includes a 180 degree field of view of a main image sensor identified for panoramic content capture and 45 degree fields of view flanking that 180 degree field of view, which 45 degree fields of view represent blind spots of the main image sensor which are nonetheless captured using one or more other image sensors. For example, a front image sensor may be used to capture image data corresponding to the 180 degree field of view and a rear image sensor may be used to capture image data corresponding to the 45 degree fields of view on either side of the 180 degree field of view.

Typical approaches for auto exposure metering of conventional panoramic images, that is, panoramic images captured using a single image sensor, may suffer from the same or similar auto exposure metering challenges as are described above for spherical images. However, spherical panoramic images suffer from a further technical challenge relative to auto exposure metering. In particular, the shape or structure of a panoramic image, be it conventional, spherical, or otherwise, generally draws focus to certain areas more than to others, specifically in areas away from the edges of the panoramic image. Thus, it would be desirable to adapt the auto exposure metering of the image data captured using each image sensor used for spherical image content capture to the panoramic format, such as by the separate metering of image data captured using each image sensor according to the ultimate spherical panoramic image output.

Implementations of this disclosure address problems such as these using auto exposure metering for spherical panoramic images, including by processing input image data using metering maps generated for spherical panoramic image content capture. A first metering map is generated for a selected image sensor, such as based on input received from that selected image sensor and a second metering map is generated for an unselected image sensor, such as based on input received from that unselected image sensor. Auto exposure level values for the selected image sensor and for the unselected image sensor are respectively metered using the first metering map and the second metering map, such as by adjusting luminance weights in certain locations of the respective image sensor panoramic image capture band. Hemispherical images are processed using the auto exposure metered level values stitched together in a panoramic format to produce a spherical panoramic image. The metering maps are generated to account for areas of greatest image data importance relative to a primary orientation direction of the spherical panoramic image. This allows for effective auto exposure metering of such areas within the resulting spherical panoramic image.

The implementations of this disclosure are described in detail with reference to the drawings, which are provided as examples so as to enable those skilled in the art to practice the technology. The figures and examples are not meant to limit the scope of the disclosure to a single implementation, and other implementations are possible by way of interchange of, or combination with, some or all of the described or illustrated elements. Wherever convenient, the same reference numbers will be used throughout the drawings to refer to same or like parts.

Figure 1B:
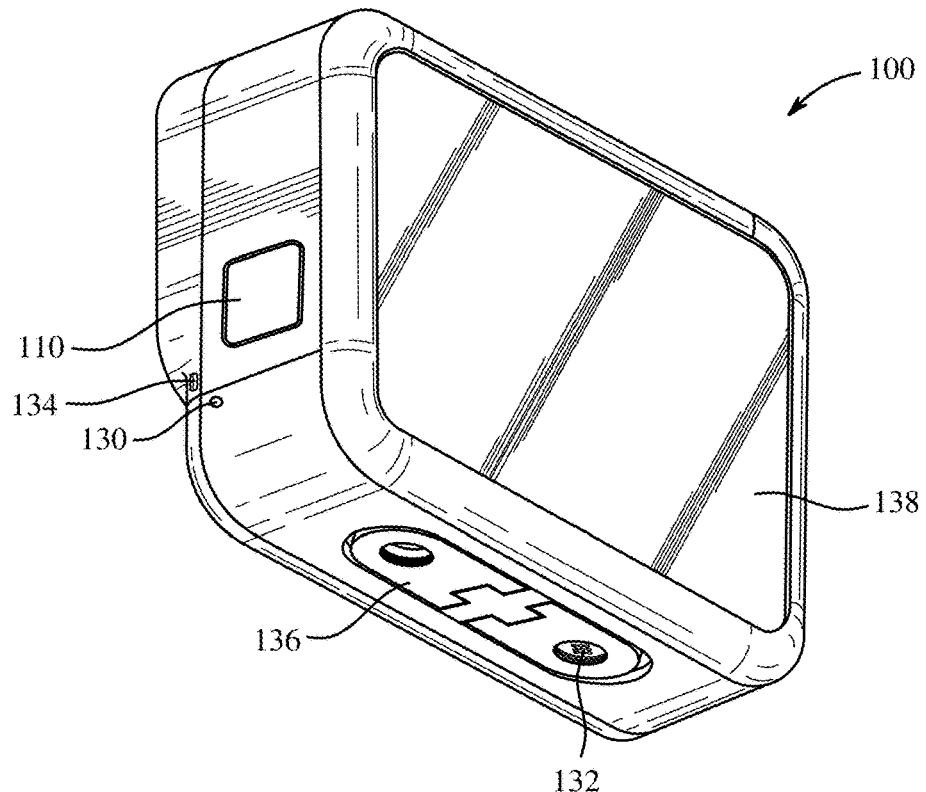

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (FPS)), a location setting, and/or a context setting, which may indicate an activity, such as mountain biking, in response to user input, and may communicate the settings, or related information, to the image capture device 100.

Figure 9:
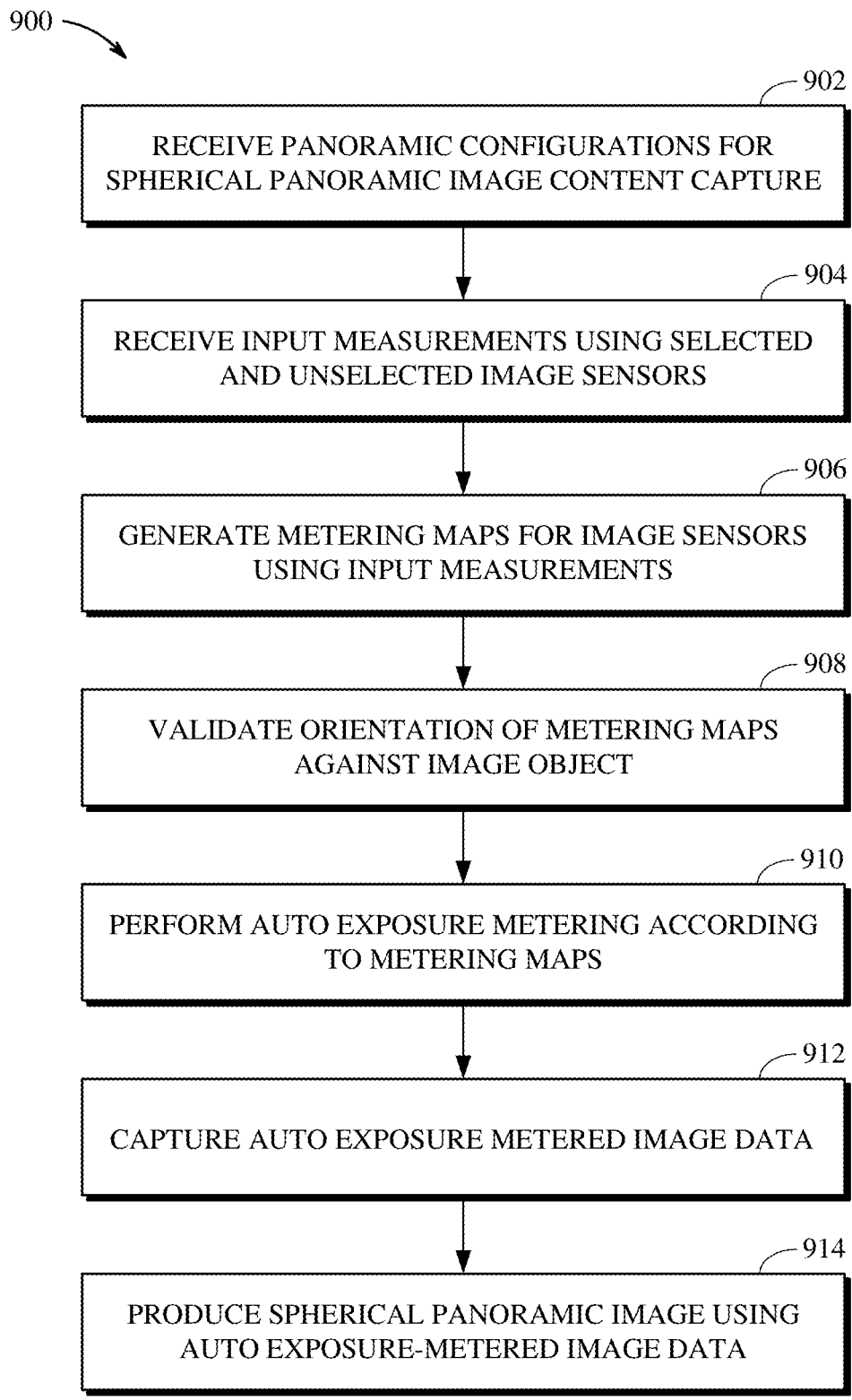
FIG. 9 is a flowchart showing an example of a technique for auto exposure metering for spherical panoramic content.

The image capture device 100 may be used to implement some or all of the techniques described in this disclosure, such as the technique 900 described in FIG. 9.

Figure 2A:
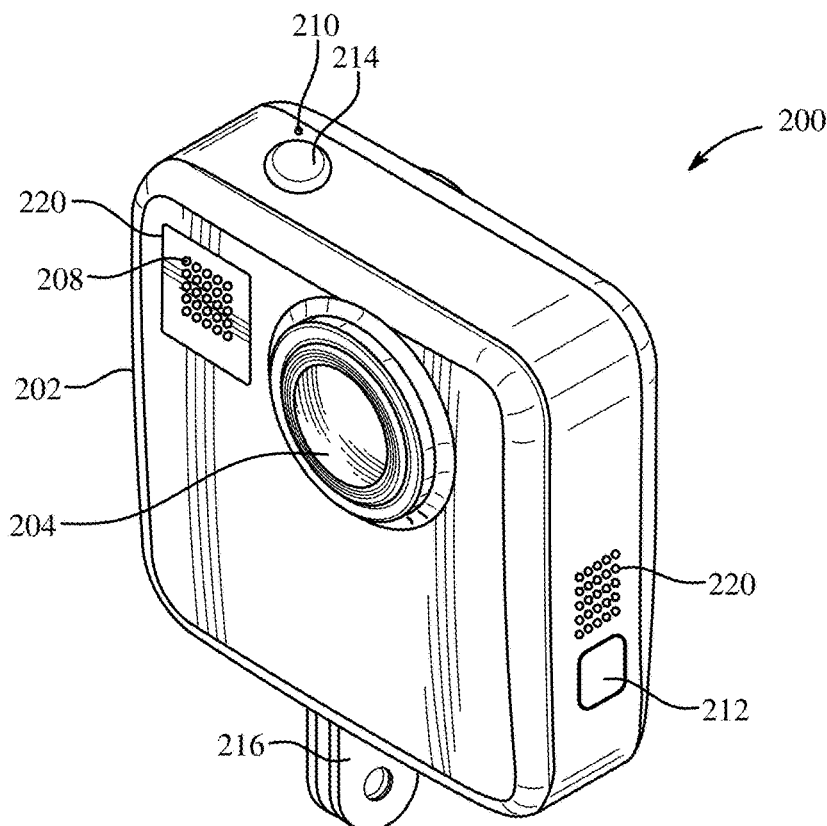
FIGS. 2A-B are isometric views of another example of an image capture device.
Figure 2B:
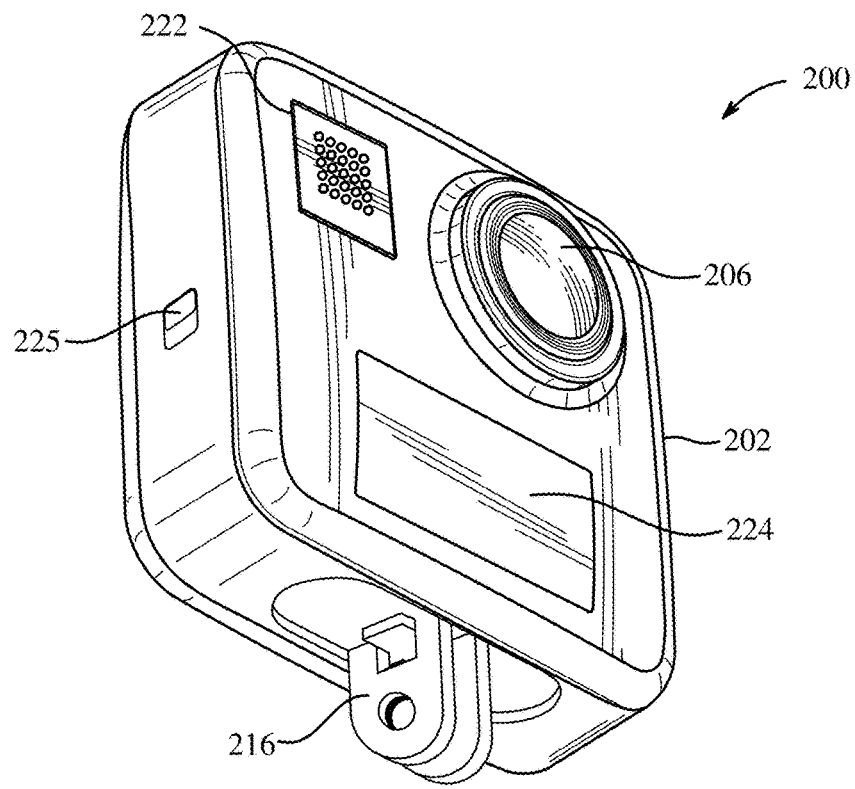

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
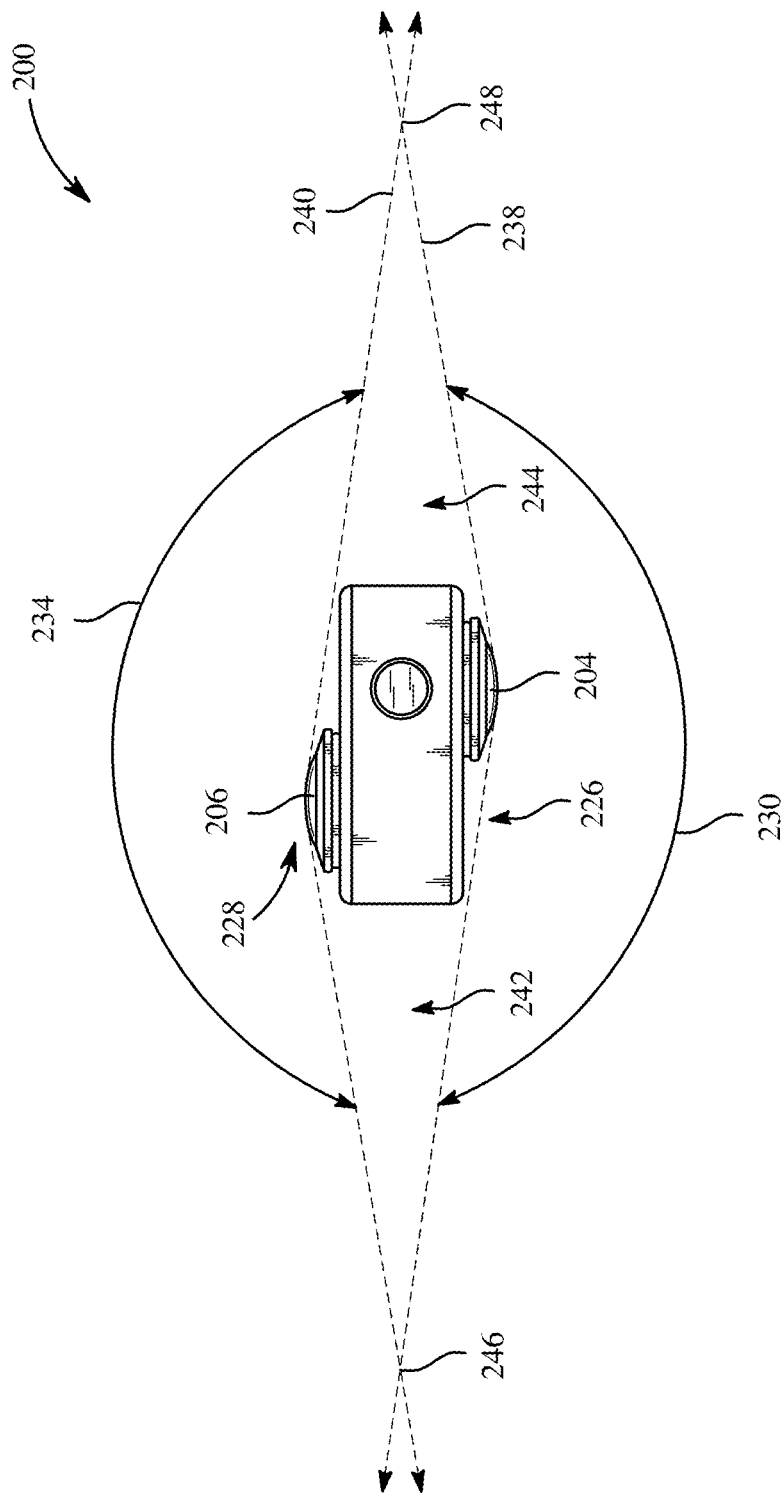
FIG. 2C is a top view of the image capture device of FIGS. 2A-B.
Figure 2D:
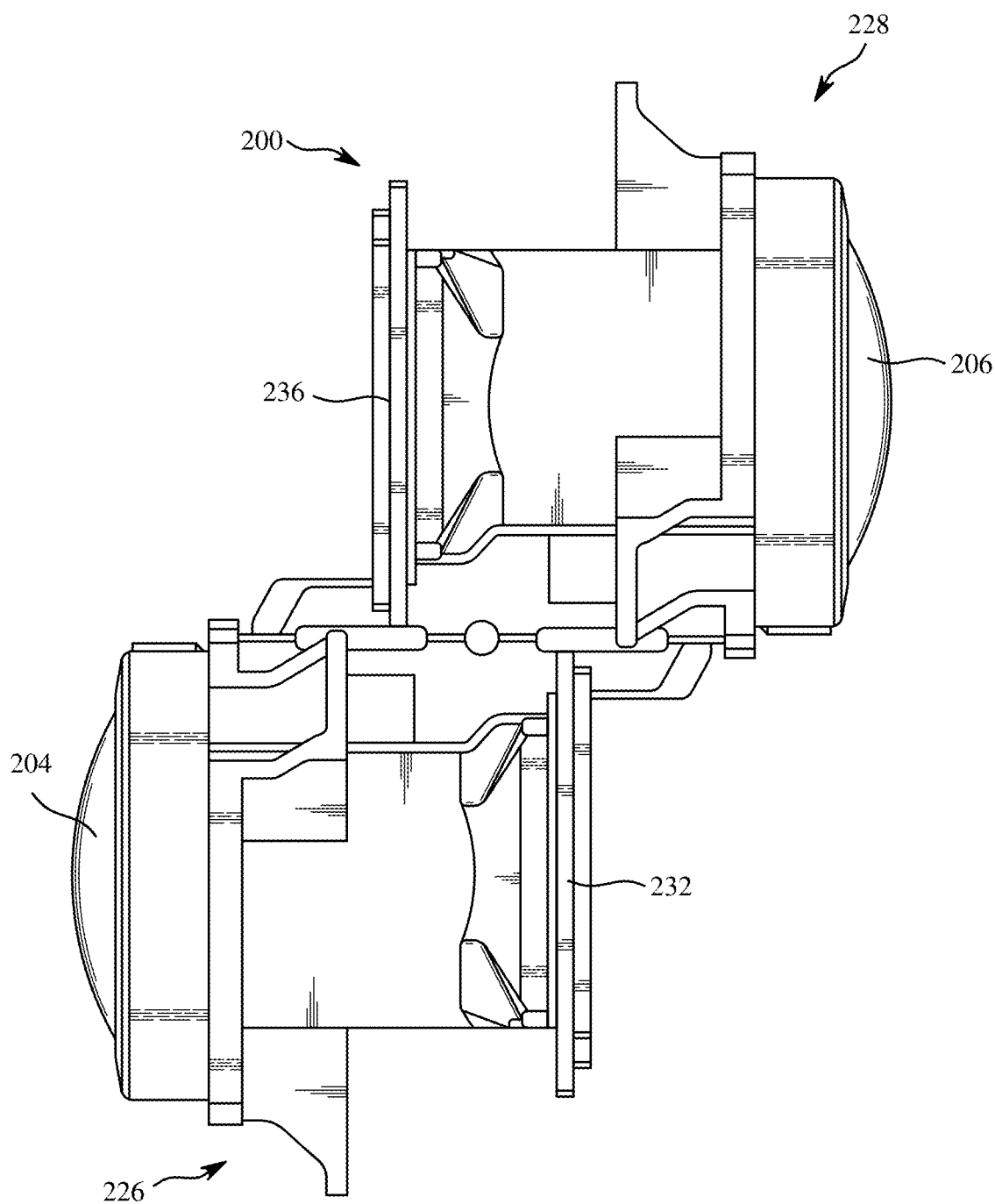
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the techniques described in this disclosure, such as the technique 900 described in FIG. 9.

Figure 3:
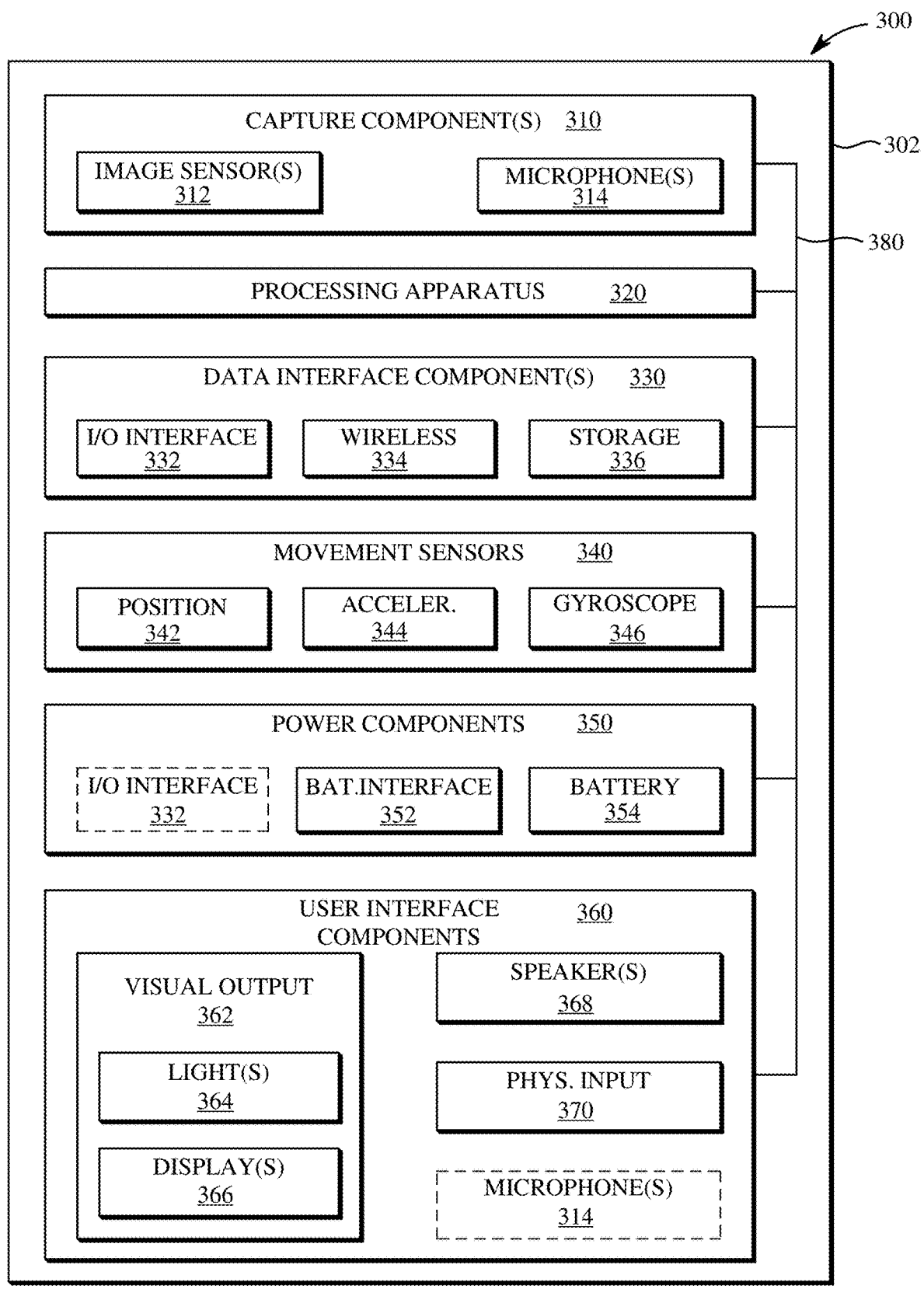
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include the I/O interface 332, as indicated in dotted line, and the power components 350 may receive power from an external source, such as a wall plug or external battery, for operating the image capture device 300 and/or charging the battery 354 of the image capture device 300.

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300.

The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the technique 900 described in FIG. 9.

Figure 4:
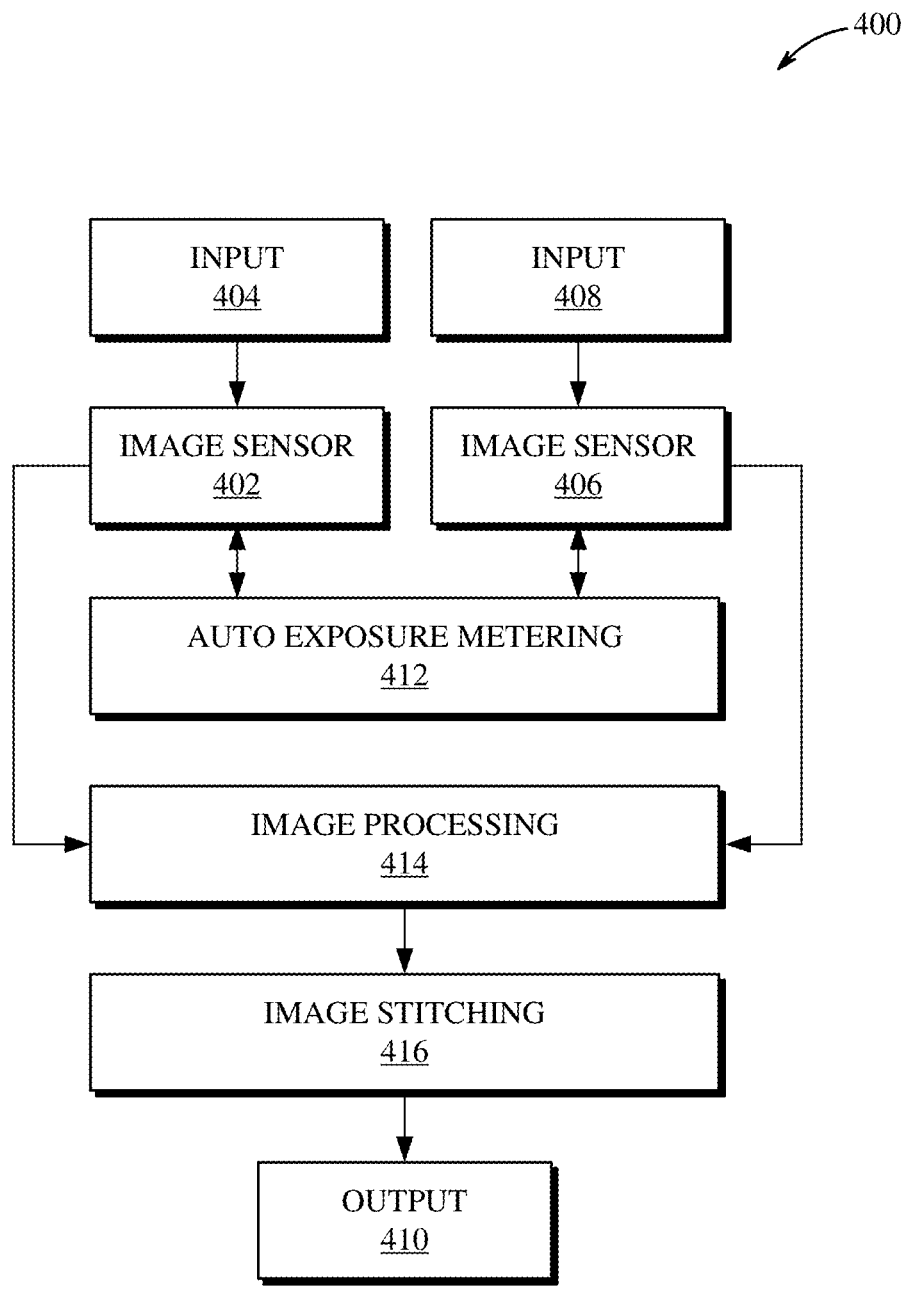
FIG. 4 is a block diagram of an example of an image capture and processing pipeline.

FIG. 4 is a block diagram of an example of an image capture and processing pipeline 400. The pipeline 400 is implemented by an image capture device, which may, for example, be the image capture device 100 shown in FIGS. 1A-B, the image capture device 200 shown in FIGS. 2A-D, the image capture device 300 shown in FIG. 3, or another image capture device. In some implementations, some or all of the pipeline 400 may represent functionality of a DSP and/or an ASIC, for example, including an image capture unit, an image processing unit, or a combined image capture and processing unit.

The pipeline 400 includes a first image sensor 402 that captures a first image based on first input 404, a second image sensor 406 that captures a second image based on second input 408. The first input 404 and the second input 408 are used to produce output 410. The first input 404 includes measurements and/or other information related to a scene which may be captured as an image using the first image sensor 402. The second input 408 includes measurements and/or other information related to a scene which may be captured as an image using the second image sensor 406. For example, the first input 404 may be or include luminance and/or object information within a scene, as identified using the first image sensor 402, and the second input 408 may be or include luminance and/or object information within the same scene as identified using the second image sensor 406. In another example, the first input 404 may be or include a first hemispherical image captured using the first image sensor 402, and the second input 408 may be or include a second hemispherical image captured using the second image sensor 406. In yet another example, the first input 404 may be or include data used to produce a first hemispherical image and the second input 408 may be or include data used to produce a second hemispherical image. The output 410 may be a spherical panoramic image produced as a result of the processing performed at the pipeline 400. Alternatively, the output 410 may refer to information usable to produce a spherical panoramic image.

The first image sensor 402 and the second image sensor 406 are image sensors of an image capture device. For example, each of the first image sensor 402 and the second image sensor 406 may be one of an image sensor of the image capture device 100, an image sensor of the image capture device 200, and/or an image sensor of the image capture device 300. The first image sensor 402 and the second image sensor 406 may be controlled independently. As an alternative, the controlling of one of first image sensor 402 or of the second image sensor 406 may be dependent upon the controlling of the other.

In particular, the first image sensor 402 and the second image sensor 406 may be different image sensors of a same image capture device, in which the first image sensor 402 and the second image sensor 406 each captures a hemispherical image which, when combined with the other hemispherical image, may be processed to produce a spherical panoramic image (e.g., as the output 410). For example, the input 404 and the input 408 may refer to information used by image sensors together having a 360 degree field-of-view, such as where each of the images is produced based on a greater than 180 degree field-of-view with some portions overlapping. In another example, the input 404 and the input 408 may refer to information used to generate images using image sensors with other fields-of-view.

The receiving of the first input 404 from the first image sensor 402 and of the second input 408 from the second image sensor 406 may be responsive to a user of an image capture device implementing the pipeline 400 indicating to capture a spherical panoramic image, for example, by the user interacting with an interface element of the image capture device which causes images to be captured by the first image sensor 402 and by the second image sensor 406. Alternatively, the receiving of the first input 404 from the first image sensor 402 and of the second input 408 from the second image sensor 406 may be automated based on one or more configurations of the first image sensor 402 and of the second image sensor 406.

The pipeline 400 includes an auto exposure metering unit 412, an image processing unit 414, and an image stitching unit 416. The auto exposure metering unit 412 performs auto exposure metering using the first input 404 received from the first image sensor 402 and using the second input 408 received from the second image sensor 406. Performing auto exposure metering includes using the first input 404 and the second input 408 to determine auto exposure control statistics to use for capturing images which will then be processed and stitched together to produce a spherical panoramic image.

The auto exposure metering unit 412 uses the first input 404 and the second input 408 to generate metering maps for the first image sensor 402 and for the second image sensor 406. The auto exposure metering unit 412 then uses those metering maps to weight auto exposure processing information within certain locations within image capture bands for the first image sensor 402 and the second image sensor 406. The weighted auto exposure processing information are used as the auto exposure control statistics, which control luminance within the scene captured by the first input 404 and the second input 408. For example, the auto exposure control statistics determined by and output from the auto exposure metering unit 412 can be used to control an aperture and/or shutter speed of the first image sensor 402 and of the second image sensor 406, such as for later use in producing a spherical panoramic image.

In some implementations, the auto exposure metering unit 412 may use the first input 404 and the second input 408 to adjust or otherwise update previously determined auto exposure control statistics. For example, previously determined auto exposure control statistics usable for image capture may be updated by the auto exposure metering unit 412 based on the first input 404 and the second input 408. In such an implementation, the output of the auto exposure metering unit 412 may refer to the updated auto exposure control statistics or the newly determined auto exposure control statistics, which may then be used to update previously determined auto exposure control statistics.

The auto exposure control statistics determined using the auto exposure metering unit 412 may result in the capture of a first hemispherical image and second hemispherical image with luminance values that, when combined to produce the spherical panoramic image, result in effective luminance variation adapted for the panoramic format. In particular, the auto exposure control statistics determined using the auto exposure metering unit 412 may be used to capture a first image and a second image, which are then processed at an image processing unit 414 and combined at an image stitching unit 416 to produce the output 410. The image processing unit 414 may represent one or more hardware components and/or software processes used to process images captured using the first image sensor 402 and the second image sensor 406 against the output of the auto exposure metering unit 412, such as to produce a first image and a second image, which may, for example, be a first hemispherical image and a second hemispherical image metered according to the determined auto exposure control statistics. The image stitching unit 416 may represent one or more hardware components and/or software processes used to stitch the first image and the second image according to a panoramic format to produce the output 410, for example, as a spherical panoramic image.

In some implementations of the pipeline 400, one or more of the auto exposure metering unit 412, the image processing unit 414, or the image stitching unit 416 may be combined into a single processing unit. For example, the auto exposure metering unit 412 and the image processing unit 414 may be combined into a single processing unit. In another example, the image processing unit 414 and the image stitching unit 416 may be combined into a single processing unit. In yet another example, the auto exposure metering unit 412, the image processing unit 414, and the image stitching unit 416 may be combined into a single processing unit. Other implementations of particular structure of the pipeline 400 are also possible.

Figure 5:
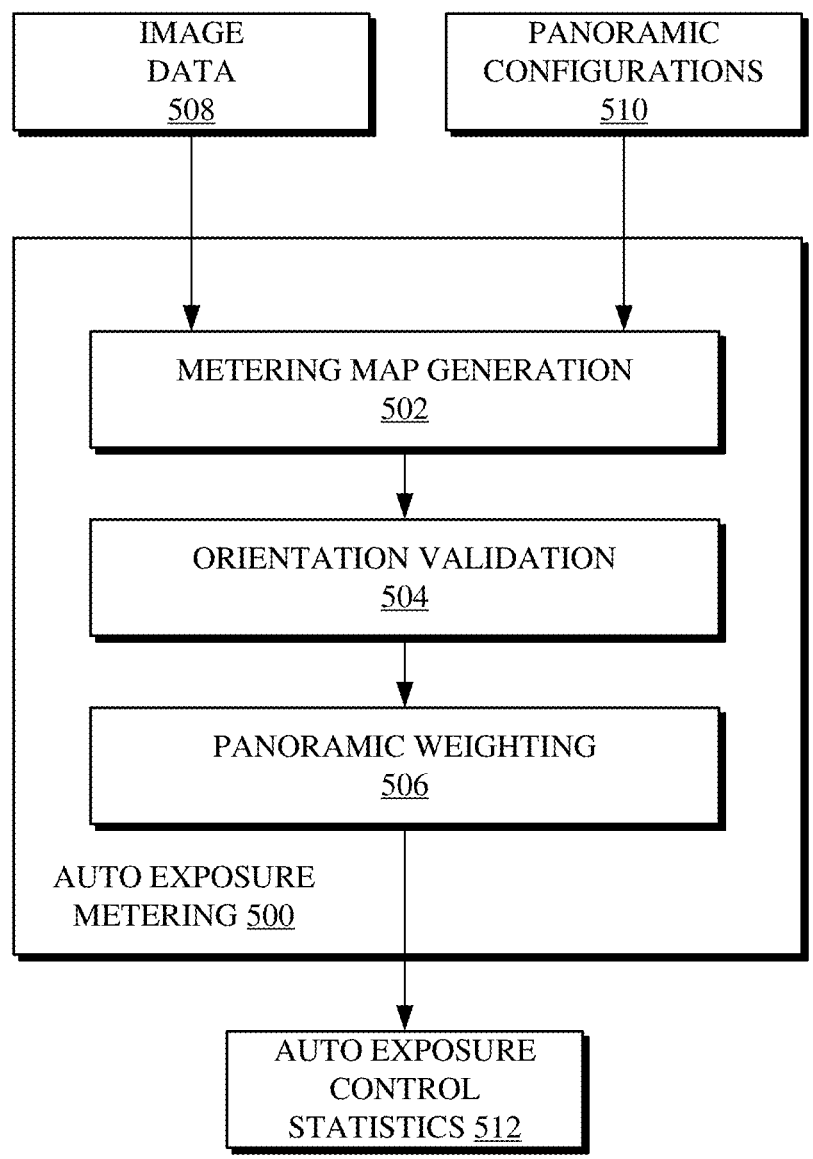
FIG. 5 is a block diagram of an example of an auto exposure processing unit of an image capture and processing pipeline.

FIG. 5 is a block diagram of an example of an auto exposure metering unit 500 of an image capture and processing pipeline. For example, the auto exposure metering unit 500 may be the auto exposure metering unit 410 of the pipeline 400 shown in FIG. 4. The auto exposure metering unit 500 includes a metering map generation unit 502, an orientation validation unit 504, and a panoramic weighting unit 506. The auto exposure metering unit 500 receives, as input, image data 508 and panoramic configurations 510. The auto exposure metering unit 500 determines, as output, auto exposure control statistics 512.

The image data 508 includes data captured using one or more image sensors, for example, of an image capture device. For example, the image data 508 can be or refer to the input 404 and/or the input 408 captured respectively using the image sensor 402 and the image sensor 406 shown in FIG. 4. The panoramic configurations 510 include indications of configurations for spherical panoramic image content capture and/or processing. For example, the panoramic configurations 510 can be or refer to one or more of an indication of a main image sensor to use for panoramic content capture (e.g., one of the image sensor 402 or the image sensor 406, being referred to as a selected image sensor), an indication of which image sensors are to be used for panoramic content capture, an indication to capture an image in a panoramic format, or the like. The auto exposure control statistics 512 are used to configure aspects of the image capture device for spherical panoramic image content capture.

The metering map generation unit 502 processes the image data 508 and the panoramic configurations 510 to generate a metering map for auto exposure metering of spherical panoramic image content to be produced based on the image data 508. The metering map generation unit 502 generates a first metering map for a selected image sensor and a second metering map for an unselected image sensor. The definition of the selected image sensor and the unselected image sensor may be indicated by the panoramic configurations 510. For example, whichever of a front image sensor or a rear image sensor (e.g., the image sensor 402 or the image sensor 406) is indicated as the main image sensor for use in capturing the panoramic content, as may be specified in the panoramic configurations 510, may be defined as the selected image sensor based on such specification within the panoramic configurations 510. Alternatively, the definition of the selected image sensor and the unselected image sensor may be defined by default, such as at the image capture device.

The first metering map generated for the selected image sensor and the second metering map generated for the unselected image sensor are generated specific to those respective image sensors. As such, the first metering map and the second metering map will include different information and/or otherwise be generated for different purposes. In particular, within the panoramic format, the selected image sensor may use an image capture band having a 180 degree field-of-view, whereas the unselected image sensor may have two 45 degree fields-of-view separated by a central region for which image data is not used for spherical panoramic image content capture. The first metering map thus includes weight information for image data within the 180 degree field-of-view of the first image sensor, and the second metering map thus includes weight information for image data within the two 45 degree fields-of-view of the second image sensor. The specific degrees described herein with respect to the field-of-view of an image sensor are listed by example, such that it is understood that metering maps may be generated for fields-of-view other than those having the specific degrees described herein.

Generating the first and second metering maps thus includes using the image data 508 and the panoramic configurations 510 to identify areas of importance within the image capture bands of the selected image sensor and the unselected image sensor. Areas of importance are those located within the center of the image capture band of the selected image sensor, those located along stitch lines between images captured using the selected and unselected image sensors, and those which include image objects. Ares of importance may be designated based on significance within the first and second metering maps, for example, by using differing values of weights throughout the first and second metering maps. The areas of importance may be identified by parsing the image data 508 for one or more of RGB statistics, region of interest statistics, or image sensor constraints (e.g., luminance shading, radial profile information, exposure compensation map information, or the like) from inputs received from each of the selected image sensor and the unselected image sensor.

The orientation validation unit 504 validates an orientation of the metering maps generated for the image sensors. In particular the orientation validation unit 504 validates the orientation of the first metering map and the orientation of the second metering map by comparing the orientation of those metering maps to an orientation of aspects of the input received from the selected image sensor and/or the unselected image sensor. For example, the orientation of the metering maps can be compared to an orientation of an image object identified within the image data 508. The orientation of the image object may be determined based on aspects within a scene that includes the image object, for example, a horizon, landscape, building, or other surface type.

Responsive to a determination that the orientation of the metering maps matches an orientation of the image object, metering maps are deemed validated and no further changes are made thereto by the orientation validation unit 504. The matching of orientations between the metering maps and the image object indicates that the image capture device comprising the selected and unselected image sensors is effectively oriented horizontally or vertically for panoramic content capture. Responsive to a determination that the orientation of the metering maps does not match the orientation of the image object, a difference between the orientation of the metering maps and the orientation of the image object is determined. The metering maps are then rotated according to that difference. The rotated metering maps are then deemed validated and no further changes are made thereto by the orientation validation unit 504.

The panoramic weighting unit 506 uses the metering maps, such as after the processing of the metering maps at the orientation validation unit 504, meter the auto exposure level values for the selected and unselected image sensors, for example, by applying weights to auto exposure level values for the selected and unselected image sensors. The auto exposure level values for the selected and unselected image sensors are or refer to values for auto exposure processing at certain locations within the panoramic image capture bands of the selected and unselected image sensors as indicated by the first and second metering maps. The weights are luminance weights representing adjusted luminance values for those certain locations within the panoramic image capture bands of the selected and unselected image sensors. The adjusting of the auto exposure level values using the luminance weights results in the auto exposure control statistics 512, which are then output from the auto exposure metering unit 500 and used for spherical panoramic image content capture.

In some implementations, the orientation validation unit 504 may be omitted. For example, the metering map generation unit 502 may include operations similar to those described above as being performed by the orientation validation unit 504. In another example, orientation validation may not be performed against the metering map generated using the metering map generation unit 502. For example, the metering map generating using the metering map generation unit 502 may be used for panoramic weighting at the panoramic weighting unit 506 regardless of an orientation of the image data 508. In another example, the metering map generating unit 502 or the panoramic weighting unit 506, responsive to determining that the orientation of the image data 508 is not appropriate (e.g., because it is not adequately horizontal or vertical) may return an error indicating that the further processing of auto exposure metering for the spherical panoramic image content to be output from the image capture device will not occur.

In some implementations, one or more of the metering map generation unit 502, the orientation validation unit 504, and/or the panoramic weighting unit 506 may be combined into a single processing unit. For example, the metering map generation unit 502 and the orientation validation unit 504 may be combined into a single processing unit. In another example, the orientation validation unit 504 and the panoramic weighting unit 506 may be combined into a single processing unit. In yet another example, the metering map generation unit 502, the orientation validation unit 504, and the panoramic weighting unit 506 may all be combined into a single processing unit.

Figure 6:
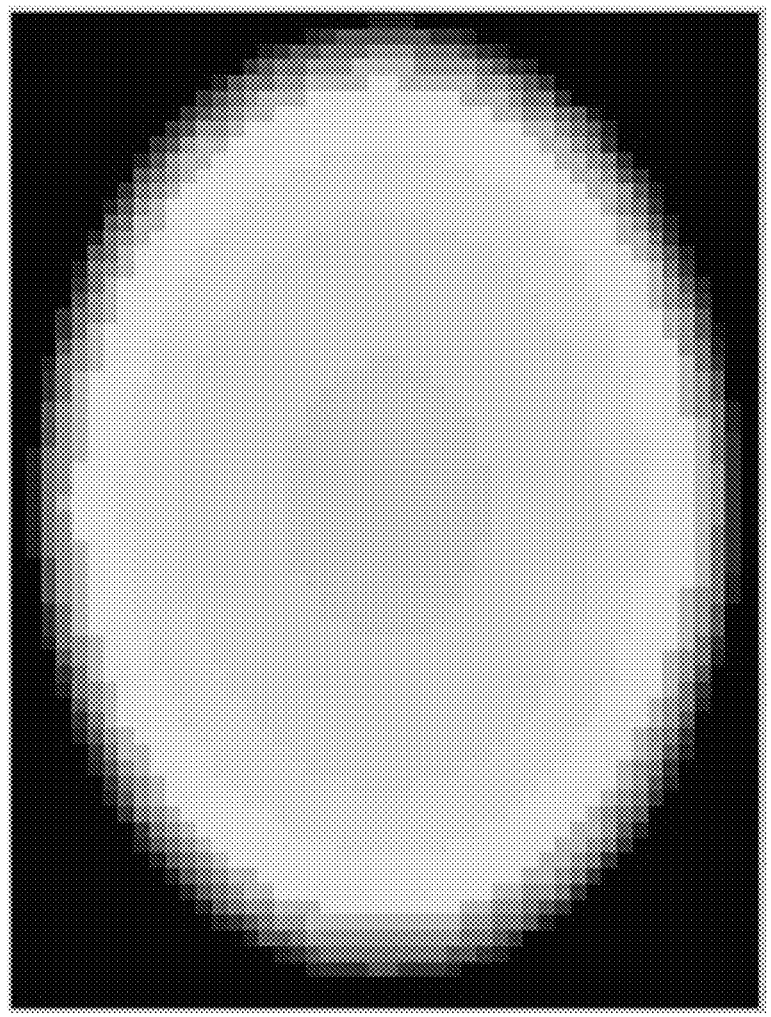
FIG. 6 is an illustration of an example of a metering map.

FIG. 6 is an illustration of an example of a metering map 600. The metering map 600 represents a metering of auto exposure values for a non-panoramic spherical image. Specifically, the metering map 600 represents auto exposure weights to apply against an entire sphere corresponding to all image data captured using, for example, one or both of a front image sensor or a rear image sensor (e.g., the image sensors 232 and 236 described with respect to FIGS. 2C and 2D). The metering map 600 may be applied against the entire sphere produced by stitching image data captured using, for example, one or both of the front image sensor or the rear image sensor. The metering map 600 generally by example shows several concentric circles each corresponding to different levels of auto exposure value weighting.

Figure 7:
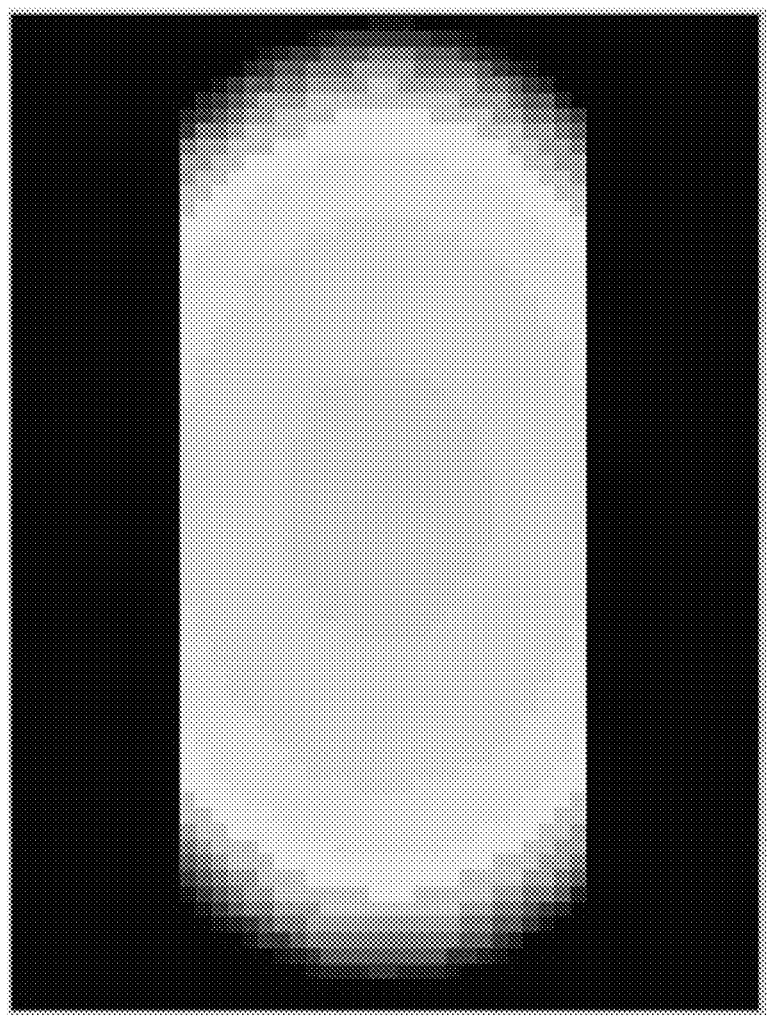
FIG. 7 is an illustration of an example of a metering map of a selected image sensor for capturing spherical panoramic content.

FIG. 7 is an illustration of an example of a metering map 700 of a selected image sensor for capturing spherical panoramic content. Whereas the metering map 600 shown in FIG. 6 is applied against the entire sphere captured using, for example, one or both of a front image sensor or a rear image sensor (e.g., the image sensors 232 and 236 described with respect to FIGS. 2C and 2D), the metering map 700 is applied against a slice of image data captured using a selected image sensor, which is an image sensor selected as a main image sensor for spherical panoramic image content capture. For example, where a front image sensor is selected as the selected image sensor, the metering map 700 may represent auto exposure weights to apply against an image data slice from the front image sensor. In another example, where a rear image sensor is selected as the selected image sensor, the metering map 700 may represent auto exposure weights to apply against an image data slice from the rear image sensor.

The metering map 700 generally by example shows a slice of image data depicting several concentric circles each corresponding to different levels of auto exposure value weighting with polar image data culled. The polar image data includes image data captured beyond boundaries of the spherical panoramic image. The locations of the boundaries are defined based on a primary orientation direction (e.g., horizontally or vertically relative to an orientation of the image capture device) of the spherical panoramic image being captured and processed. In the example shown, a horizontal spherical panoramic image is being captured and processed. Accordingly, the polar image data refers to image data located above a top boundary line and below a bottom boundary line. In another example in which vertical spherical panoramic image is being captured and processed, the polar image data may instead refer to image data located to the left of a left boundary line and to the right of a right boundary line. Culling the polar image data may include discarding the polar image data. Alternatively, culling the polar image data may include retaining such image data but not adjusting auto exposure values therefor.

Figure 8:
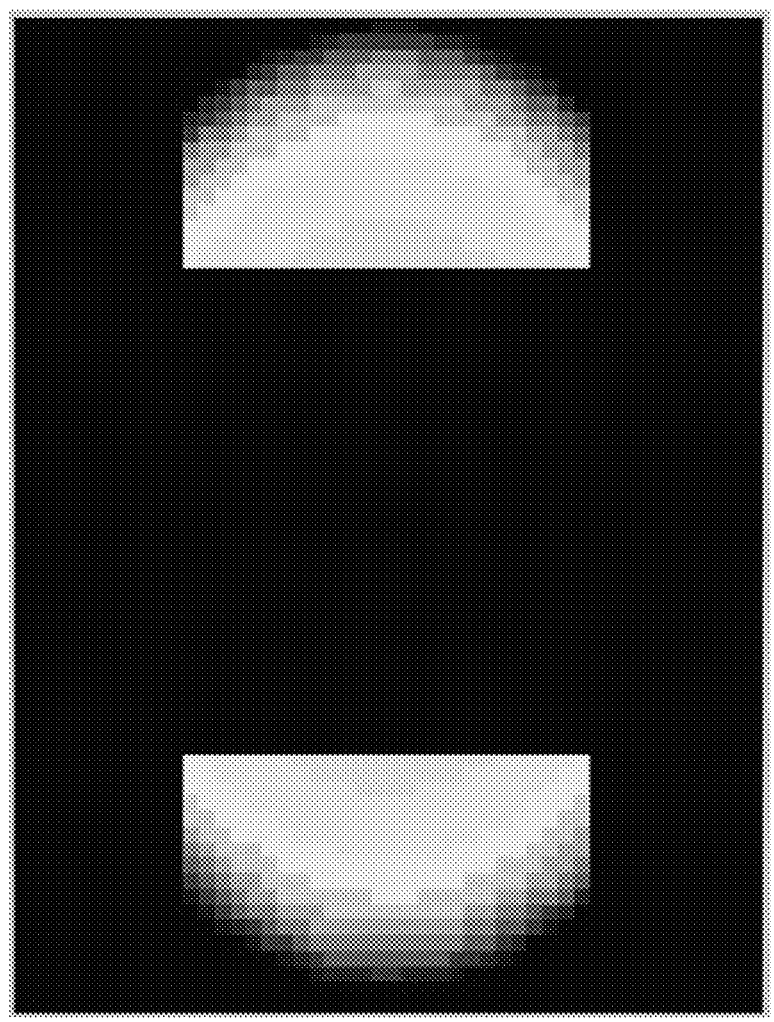
FIG. 8 is an illustration of an example of a metering map of an unselected image sensor for capturing spherical panoramic content.

FIG. 8 is an illustration of an example of a metering map 800 of an unselected image sensor for capturing spherical panoramic content. Whereas the metering map 700 shown in FIG. 7 is applied against a slice of image data captured using a selected image sensor (e.g., one of the image sensor 232 or the image sensor 236 described with respect to FIGS. 2C and 2D), the metering map 800 is applied against overlap slices of image data captured using an unselected image sensor, which is an image sensor other than the image sensor selected as a main image sensor for spherical panoramic image content capture. For example, where a front image sensor is selected as the selected image sensor, the metering map 800 may represent auto exposure weights to apply against image data overlap slices from the rear image sensor. In another example, where a rear image sensor is selected as the selected image sensor, the metering map 800 may represent auto exposure weights to apply against image data overlap slices from the front image sensor.

The metering map 800 generally by example shows overlap slices of image data depicting several concentric circles each corresponding to different levels of auto exposure value weighting with polar image data and center image data culled. The polar image data includes image data captured beyond boundaries of the spherical panoramic image, for example, consistent with the polar image data described above with respect to the metering map 700. The center image data includes image data located within a central portion of the captured image data (e.g., the generally rectangular unshaded area as shown in the center of the metering map 800). Culling the polar and center image data may include discarding the polar and/or center image data. Alternatively, culling the polar and center image data may include retaining such image data but not adjusting auto exposure values therefor.

Further details of implementations and examples of techniques for auto exposure metering for spherical panoramic content are now described. FIG. 9 is a flowchart showing an example of a technique 900 for auto exposure metering for spherical panoramic content. The technique 900 can be performed, for example, using hardware and/or software components of an image capture system, such as the image capture device 100 shown in FIGS. 1A-B, the image capture device 200 shown in FIGS. 2A-D, and/or the image capture device 300 shown in FIG. 3. The image capture device 100, the image capture device 200, and/or the image capture device 300 may be implemented using an auto exposure processing unit of an image capture and processing pipeline, for example, as described in the auto exposure metering unit 412 shown in FIG. 4 and/or the auto exposure metering unit 500 shown in FIG. 5.

In another example, the technique 900 can be performed using an integrated circuit. The integrated circuit may, for example, be a field programmable gate array (FPGA), programmable logic device (PLD), reconfigurable computer fabric (RCF), system on a chip (SoC), ASIC, and/or another type of integrated circuit. An image processor of the integrated circuit may, for example, include a processor having one or multiple cores configured to execute instructions to perform some or all of the technique 900.

Although the technique 900 is described with respect to a series of operations, the operations comprising the technique 900 may be performed in orders other than those described herein. In some implementations, the technique 900 may include additional, fewer, or different operations than those described herein.

At 902, panoramic configurations for spherical panoramic image content capture are received. The panoramic configurations are configurations defining one image sensor of a multiple image sensor image capture device as a selected image sensor for spherical panoramic image content capture. The panoramic configurations may thus explicitly or implicitly further define one or more other image sensors of the image capture device as an unselected image sensor the spherical panoramic image content capture. For example, where the image capture device includes first and second image sensors, the panoramic configurations may define the first image sensor as the selected image sensor and may define the second image sensor as the unselected image sensor.

The panoramic configurations may be received as input from a user of the image capture device. For example, the panoramic configurations may indicate a selection by the user of one image sensor of the image capture device as the selected image sensor. Alternatively, the panoramic configurations may be received as output of input analysis performed at the image capture device or at a connected device. For example, input analysis software or another hardware component or software operation at the image capture device or at a connected device may process initial pre-capture image data representing a subject of the spherical panoramic image content capture to determine the panoramic configurations.

At 904, input measurements recorded, collected, or otherwise identified using the image sensors of the image capture device are received. The input measurements may be or refer to input received from the selected and unselected image sensors of the image capture device. For example, where a first image sensor of the image capture device is defined as the selected image sensor and a second image sensor of the image capture device is defined as the unselected image sensor, receiving the input measurements can include receiving first input from the first image sensor and second input from the second image sensor.

At 906, metering maps are generated for the image sensors using the received input measurements. Generating the metering maps using the received input measurements includes generating a first metering map corresponding to input received from the selected input sensor and generating a second metering map corresponding to input received from the unselected input sensor. The metering maps represent or otherwise correspond to the input measurements. For example, the first metering map may represent luminance weights for a panoramic image capture band of the selected image sensor, and the second metering map may represent luminance weights for a panoramic image capture band of the unselected image sensor.

The metering maps generated for the image sensors correspond to different fields-of-view based on the applicable fields-of-view used to produce a spherical panoramic image. For example, the first metering map may correspond to a full field-of-view (e.g., 180 degrees) of the first image sensor without a polar region of the selected (e.g., first) image sensor, and the second metering map may correspond to two partial fields-of-view (e.g., 45 degrees, each) of the unselected (e.g., second) image sensor without a polar region and without a center region. Each of the two partial fields-of-view of the unselected image sensor may, for example, be located at opposing sides of the full field-of-view of the selected image sensor.

At 908, the orientation of the metering maps is validated. Validating the orientation of the metering maps includes validating an orientation of the first metering map and of the second metering map against an orientation of an image object identified using one or both of the selected (e.g., first) image sensor or the unselected (e.g., second) image sensor, such as by using the received input measurements.

Validating the orientation of the metering maps may thus include or refer to detecting an orientation of an image object within the input measurements (e.g., within one or both of first input received from the selected (e.g., first) image sensor or second input received from the unselected (e.g., second) image sensor) and determining whether the orientation of the image object corresponds to an orientation of the image capture device. Responsive to a determination that the orientation of the first metering map and of the second metering map does not match the orientation of the image object, the first metering map and the second metering map are rotated according to a difference between the orientation of the first metering map and of the second metering map and the orientation of the image object. Responsive to a determination that the orientation of the first metering map and of the second metering map matches the orientation of the image object, no rotation is performed against the metering maps.

At 910, auto exposure metering is performed according to the metering maps. Performing auto exposure metering according to the metering maps may include determining auto exposure control statistics for the image sensors. For example, the auto exposure control statistics may be determined for the selected (e.g., first) image sensor using the first metering map and for the unselected (e.g., second) image sensor using the second metering map. Determining the auto exposure control statistics can include applying the luminance weights represented within the first metering map to the panoramic image capture band of the first image sensor and applying the luminance weights represented within the second metering map to the panoramic image capture band of the second image sensor.

At 912, auto exposure metered image data is captured using the selected and unselected image sensors. For example, a first image may be captured by the selected image sensor according to the auto exposure control statistics, and a second image may be captured by the unselected image sensor according to the auto exposure control statistics. The first and second images, or the auto exposure metered image data, to the extend different, may be or refer to hemispherical images captured using the selected and unselected image sensors.

Producing auto exposure metered image data by metering auto exposure levels of a first image captured using the selected image sensor according to the first metering map and by metering auto exposure levels of a second image captured using the unselected image sensor according to the second metering map may thus include or otherwise refer to operations described above for performing auto exposure metering and/or operations described above for capturing auto exposure metered image data.

At 914, a spherical panoramic image is produced by combining some or all of the auto exposure metered image data captured using the selected and unselected image sensors. For example, combining the auto exposure metered image data can include stitching together portions of the captured first and second hemispherical images to produce a spherical panoramic image. For example, producing the spherical panoramic image may include combining a portion of the first hemispherical image corresponding to a panoramic image capture band of the selected image sensor and a portion of the second hemispherical image corresponding to the panoramic image capture band of the unselected image sensor. The size and/or share of the spherical panoramic image may correspond to the size and/or share of the image capture bands for the selected and unselected image sensors, combined.

In some implementations, producing the spherical panoramic image may include culling portions of the auto exposure metered image data. For example, producing the spherical panoramic image may include culling portions of the first hemispherical image located outside of the first metering map, and culling portions of the second hemispherical image located outside of the second metering map. In some implementations, this culling may also or instead be performed as part of the operations for capturing the auto exposure metered image data.

In some implementations, the technique 900 may omit the operations for validating the orientation of the image capture device during the capture of image data by the image sensors against the orientation of an image object within a subject scene of the image data. For example, the orientation validation features of the technique 900 may be selectively enabled or disabled, such as by a user of the image capture device on which the technique 900 is performed.

In some implementations, the technique 900 may omit the operations for receiving the panoramic configurations for spherical panoramic image content capture. For example, default definitions for the spherical panoramic image content capture, such as an indication of which image sensor is the selected image sensor, and indication of a primary orientation direction for the image, or the like, may be used in place of definitions otherwise available from the panoramic configurations.

Where certain elements of these implementations may be partially or fully implemented using known components, those portions of such known components that are necessary for an understanding of the disclosure have been described, and detailed descriptions of other portions of such known components have been omitted so as not to obscure this disclosure.

In the present specification, an implementation showing a singular component should not be considered limiting; rather, this disclosure is intended to encompass other implementations including a plurality of the same component, and vice-versa, unless explicitly stated otherwise herein. Further, the disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared, or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smartphones, personal integrated communication or entertainment devices, or another device capable of executing a set of instructions.

As used herein, the term "computer program" or "software" is meant to include any sequence of machine-cognizable steps which perform a function. Such program may be rendered in any programming language or environment including, for example, C/C++, C#, Fortran, COBOL, MATLAB™, PASCAL, Python, assembly language, markup languages (e.g., HTML, Standard Generalized Markup Language (SGML), XML, Voice Markup Language (VoxML)), as well as object-oriented environments such as the Common Object Request Broker Architecture (CORBA), Java™ (including J2ME, Java Beans), and/or Binary Runtime Environment (e.g., Binary Runtime Environment for Wireless (BREW)).

As used herein, the terms "connection," "link," "transmission channel," "delay line," and "wireless" mean a causal link between two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include FPGAs, PLDs, RCFs, SoCs, ASICs, and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), DRAM, Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of DSPs, reduced instruction set computers (RISCs), general-purpose complex instruction set computing (CISC) processors, microprocessors, gate arrays (e.g., FPGAs), PLDs, RCFs, array processors, secure microprocessors, ASICs, and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA) (e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, Cellular Digital Packet Data (CDPD), satellite systems, millimeter wave or microwave systems, acoustic, infrared (i.e., IrDA), and/or other wireless interfaces.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of this disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within this disclosure.

While the above-detailed description has shown, described, and pointed out novel features of this disclosure as applied to various implementations, it will be understood that various omissions, substitutions, and changes in the form and details of the devices or processes illustrated may be made by those skilled in the art without departing from this disclosure. The foregoing description is in no way meant to be limiting, but rather should be taken as illustrative of the general principles of the technology.

What is claimed is:

1. An image capture device, comprising:
    a first image sensor arranged in a first direction;
    a second image sensor arranged in a second direction opposing the first direction;
    a memory that stores instructions for producing a spherical panoramic image using auto exposure control statistics for the first image sensor and the second image sensor; and
    a processor that executes the instructions to:
        receive a first input from the first image sensor and a second input from the second image sensor;
        generate, using the first input, a first metering map representing luminance weights for a panoramic image capture band of the first image sensor;
        generate, using the second input, a second metering map representing luminance weights for a panoramic image capture band of the second image sensor;
        determine the auto exposure control statistics for the first image sensor using the first metering map and for the second image sensor using the second metering map;
        capture, according to the auto exposure control statistics, a first hemispherical image using the first image sensor and a second hemispherical image using the second image sensor; and
        produce the spherical panoramic image by combining a portion of the first hemispherical image corresponding to the panoramic image capture band of the first image sensor and a portion of the second hemispherical image corresponding to the panoramic image capture band of the second image sensor.

2. The image capture device of claim 1, wherein the first metering map corresponds to a full field-of-view of the first image sensor without a polar region of the first image sensor, wherein the second metering map corresponds to two partial fields-of-view of the second image sensor without a polar region and without a center region, and wherein the two partial fields-of-view of the second image sensor are located at opposing sides of the full field-of-view of the first image sensor.

3. The image capture device of claim 2, wherein the instructions include instructions to:

receive panoramic configurations defining the first image sensor as a selected image sensor for spherical panoramic image content capture and defining the second image sensor as an unselected image sensor for the spherical panoramic image content capture.

4. The image capture device of claim 3, wherein the panoramic configurations are determined based on initial pre-capture image data representing a subject of the spherical panoramic image content capture.

5. The image capture device of claim 3, wherein the panoramic configurations are received as input from a user of the image capture device, and wherein the panoramic configurations indicate a selection by the user of the first image sensor as the selected image sensor.

6. The image capture device of claim 1, wherein the instructions to determine the auto exposure control statistics for the first image sensor using the first metering map and for the second image sensor using the second metering map include instructions to:
apply the luminance weights represented within the first metering map to the panoramic image capture band of the first image sensor; and
apply the luminance weights represented within the second metering map to the panoramic image capture band of the second image sensor.

7. The image capture device of claim 1, wherein the instructions include instructions to:
responsive to the generation of the first metering map and the generation of the second metering map, validate an orientation of the first metering map and of the second metering map against an orientation of an image object identified using one or both of the first image sensor or the second image sensor.

8. The image capture device of claim 7, wherein the instructions to validate the orientation of the first metering map and of the second metering map against the orientation of the image object identified using the one or both of the first image sensor or the second image sensor include instructions to:
responsive to a determination that the orientation of the first metering map and of the second metering map does not match the orientation of the image object, rotate the first metering map and the second metering map according to a difference between the orientation of the first metering map and of the second metering map and the orientation of the image object.

9. A method, comprising:
receiving first input from a selected image sensor of an image capture device and second input from an unselected image sensor of the image capture device;
generating a first metering map representing weighted values corresponding to the first input and a second metering map representing weighted values corresponding to the second input;
producing auto exposure metered image data by metering auto exposure levels of a first image captured using the selected image sensor according to the first metering map and by metering auto exposure levels of a second image captured using the unselected image sensor according to the second metering map; and
producing a spherical panoramic image using the auto exposure metered image data.

10. The method of claim 9, further comprising:
receiving, based on user input, panoramic configurations identifying a first image sensor of the image capture device as the selected image sensor and identifying a second image sensor of the image capture device as the unselected image sensor.

11. The method of claim 9, wherein producing the auto exposure metered image data by metering the auto exposure levels of the first image captured using the selected image sensor according to the first metering map and by metering the auto exposure levels of the second image captured using the unselected image sensor according to the second metering map comprises:
adjusting luminance information within a panoramic image capture band of the first image sensor at locations and by values specified within the first metering map; and
adjusting luminance information within a panoramic image capture band of the second image sensor at locations and by values specified within the second metering map.

12. The method of claim 11, wherein producing the spherical panoramic image using the auto exposure metered image data comprises:
culling portions of the first hemispherical image located outside of the first metering map; and
culling portions of the second hemispherical image located outside of the second metering map.

13. The method of claim 9, wherein the first metering map corresponds to a full field-of-view of the first image sensor without a polar region of the first image sensor, wherein the second metering map corresponds to two partial fields-of-view of the second image sensor without a polar region and without a center region, and wherein the two partial fields-of-view of the second image sensor are located at opposing sides of the full field-of-view of the first image sensor.

14. The method of claim 9, further comprising:
detecting an orientation of an image object within one or both of the first input or the second input; and
determining whether the orientation of the image object corresponds to an orientation of the image capture device.

15. The method of claim 14, wherein generating the first metering map representing the weighted values for the first input and the second metering map representing the weighted values for the second input comprises:
responsive to determining that the orientation of the image object does not correspond to the orientation of the image capture device, rotating the first metering map and the second metering map according to a difference between the orientation of the image object and the orientation of the image capture device.

16. An image processor, comprising:
an auto exposure metering unit that determines auto exposure control statistics adapted for spherical panoramic image content capture for a first image sensor and a second image sensor using metering maps generated based on input received from the first image sensor and from the second image sensor;
an image processing unit that produces first auto exposure metered image data by processing, according to the auto exposure control statistics, a first hemispherical image captured using the first image sensor and that produces second auto exposure metered image data by processing, according to the auto exposure control statistics, a second hemispherical image captured using the second image sensor; and
an image stitching unit that stitches the first auto exposure metered image data and the second auto exposure metered image data in a panoramic format to produce a spherical panoramic image.

17. The image processor of claim 16, wherein the auto exposure metering unit includes a metering map generation unit that:
generates the first metering map using the input received from the first image sensor and panoramic configurations defining a primary orientation direction for the spherical panoramic image content capture; and
generates the second metering map using the input received from the second image sensor and the panoramic configurations.

18. The image processor of claim 16, wherein the auto exposure metering unit includes an orientation validation unit that rotates the first metering map and the second metering map responsive to a comparison between an orientation of the first metering map and the second metering map and an orientation of an image object identified using the input received from the first image sensor and from the second image sensor.

19. The image processor of claim 18, wherein operation of the orientation validation unit is selectively enabled by a user of the image capture device.

20. The image processor of claim 16, wherein the auto exposure metering unit includes a panoramic weighting unit that determines the auto exposure control statistics by:
applying weights of the first metering map to locations within a panoramic image capture band of the first image sensor; and
applying weights of the second metering map to locations within a panoramic image capture band of the second image sensor.

* * * * *